Dec. 25, 1951 S. KURLANDSKY 2,579,743
DRY CELL AND ELECTRODE THEREFOR
Filed Dec. 31, 1949
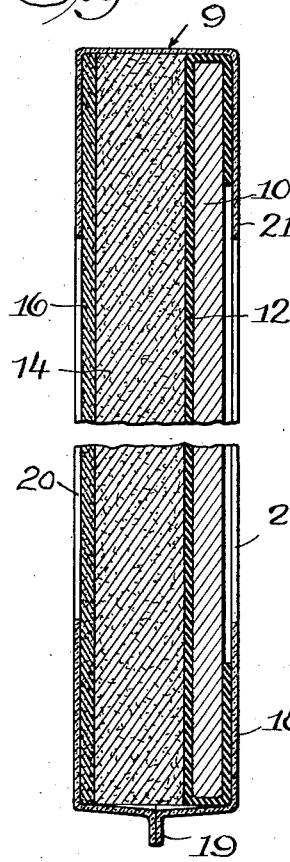
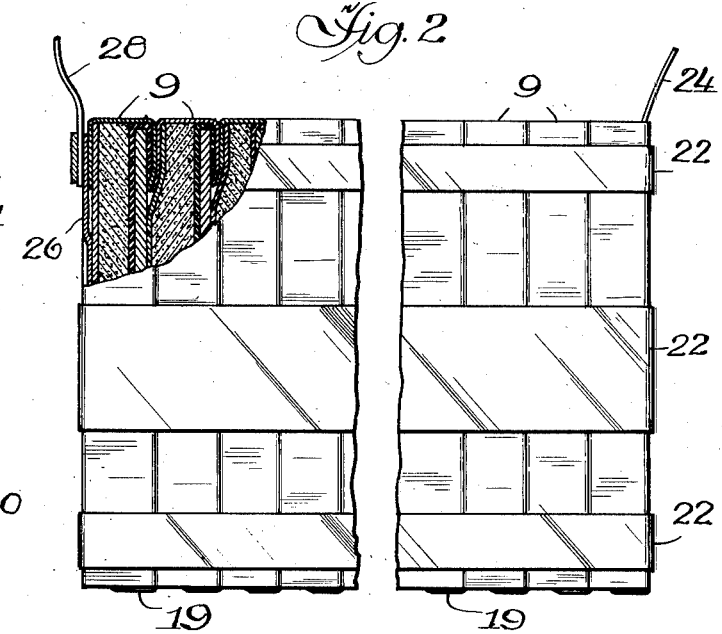
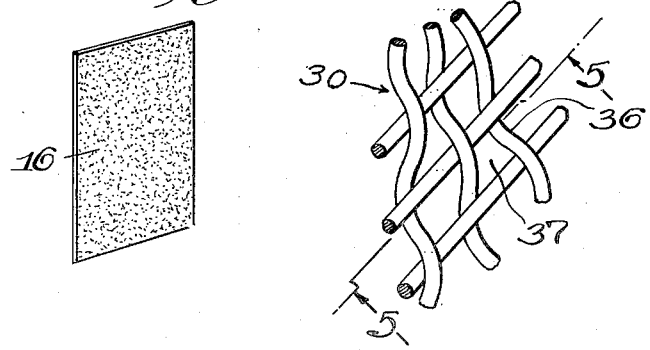
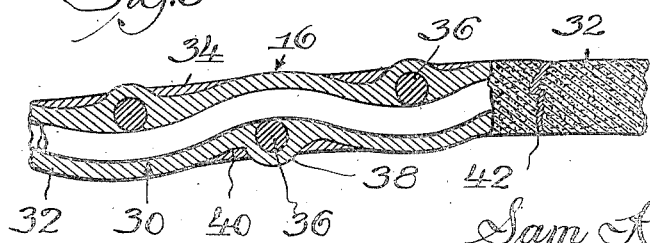
Inventor,
Sam Kurlandsky,
Jones, Jesel & Darbo Attys.

Patented Dec. 25, 1951

2,579,743

UNITED STATES PATENT OFFICE 2,579,743

DRY CELL AND ELECTRODE THEREFOR

Sam Kurlandsky, Freeport, Ill., assignor, by mesne assignments, to Burgess Battery Company, Freeport, Ill., a corporation of Delaware Application December 31, 1949, Serial No. 136,373

3 Claims. (Cl. 136—121)

This invention relates to improvements in primary batteries, and particularly to dry batteries of the flat type in which the elements of the battery cells are in the form of flat sheets or plates and the individual cells are in the form of flat wafers.

Flat cell batteries are of several types. In one of these the flat cell elements are arranged in a continuous series or stack and held together under compression by a container or other suitable means, the negative electrode of one cell being in direct contact with the positive electrode of the next cell whereby the cells are conductively connected together, and the exposed sides of the assembly are suitably sealed from the atmosphere by a fusible sealing composition.

In another type of battery, the cells are individually enclosed in envelopes of film material having openings or windows through which the negative electrode of one cell makes contact with the positive electrode of the adjacent cell and the cells are held together by a container or other suitable means. In such arrangement the electrodes undergo bending to make contact with each other through the windows.

In batteries of the types described, the positive electrodes of the cells are commonly in the form of thin, non-metallic, conductive sheets in which the conductive factor is carbon, and the invention is directed to the provision of an improved form of carbon electrode of this type in flat cell batteries. While the improved electrode is adapted for use with both types of battery, it is especially advantageous with the second type in which the cells are individually enclosed in non-conductive envelopes, because it is desirable that the electrode be thin and flexible and that at the same time it be impermeable to the liquid electrolyte whereby the electrolyte of each cell is confined to that cell and objectionable short circuits between cells are avoided. The difficulty has been encountered heretofore that the thin positive electrode is not sufficiently impervious to cell liquid to be completely satisfactory.

It is the principal object of the invention to provide a sheet-form conductive carbon electrode which is impervious to the cell electrolyte and may be made thin and flexible if desired so that it can be bent to make firm conductive contact with the negative electrode of the adjacent cell.

It is another object of the invention to provide a dry cell of the flat type having a sheet-form, conductive carbon electrode of the character which has been described which does not permit leakage of electrolyte from the cell.

It is another object of the invention to provide an improved method for making a conductive positive electrode of the character described.

Briefly, the objects are accomplished by coating and impregnating a non-conductive, preferably foraminous sheet such as woven cotton cloth with a conductive carbonaceous composition composed of conductive carbon particles, a binder and a solvent, evaporating the solvent, coating the impregnated sheet with a wax and wiping or scraping the surface of the coated sheet to remove the wax from at least portions of the surfaces of the sheet.

Other objects and advantages will become apparent as the following description progresses. In the description and the accompanying drawing an embodiment of the invention is set forth in which the battery cells are individually isolated by envelopes of thin non-conductive material.

In the drawing:

Fig. 1 is a vertical sectional view of one of the cells of the battery, shown on an enlarged scale;

Fig. 2 is a side view, partly in section, of a battery of cells such as is shown in Fig. 1;

Fig. 3 is a perspective view of a sheet-form positive electrode in accordance with the invention;

Fig. 4 is an enlarged perspective view of a fragment of the woven fabric base of said electrode, and Fig. 5 is an enlarged sectional view of a fragment of the electrode, taken on broken line 5—5 of Fig. 4.

The invention is described and illustrated in connection with its application to a cell of the Leclanche type, but it is not limited thereto and may be applied to other types of cells. The single cell illustrated in Fig. 1 and designated generally by the numeral 9 is made up of juxtaposed flat elements consisting of, in the order named, the metal negative electrode 10, bibulous separating member 12, mix cake 14, and the conductive positive electrode 16 which is made in accordance with the present invention. For convenience, the element 16 is designated by the term "electrode" although its principal and possibly only function is to provide electrical connection between the element 14 of cell 9 and the zinc negative electrode 10 of the adjacent cell.

While the flat elements of the cell are illustrated as being of rectangular shape, they may be of any other desired shape, such as circular, etc. The negative electrode 10 may be composed of zinc or other suitable metal and the separating member 12 may be composed of a suitable bibulous material such as a porous paper or pulp sheet, and it preferably not only covers the side of electrode 10 facing mix cake 14 but also the edges and marginal portions of the opposite side of the electrode as shown. The mix cake 14 may be composed of the usual mixture of powdered manganese dioxide and carbon, and the separator 12 and mix cake 14 may be moistened with the liquid cell electrolyte, which may be the usual aqueous solution of ammonium chloride and zinc chloride. The positive electrode 16 will be described more in detail hereinafter. To isolate the cell and confine the electrolyte thereof and the liquid which may be formed during operation, the cell elements are enclosed in an envelope 18 of a non-conductive, liquid-impervious, electrolyte-resistant sheet material, which may be a flexible film of rubber hydrochloride, the copolymer of vinyl chloride and vinyl acetate or the like. The envelope 18 may be formed in any suitable manner. The envelope shown in Fig. 1 is formed by placing one edge of the assembled elements against the median portion of a strip of the sheet material and folding the latter so that the portions thereof on opposite sides of the fold cover the opposite broad surfaces of the assembled elements and extend beyond the edges thereof. The extending portions are then joined together by an adhesive or by heat-sealing to form the joint indicated at 19. The assembled elements and wrapper form the flat, wafer-shaped cell 9. The envelope may also be made by covering each broad surface of the assembled elements with a separate layer of the sheet material and joining the layers together at their margins beyond the edges of the assembled elements.

Openings or windows 20 of substantial size are provided in the broad portions of the envelopes 18 which overlie the electrodes 10 and 16 respectively, the said openings being in alignment with each other so that when a number of the cells are stacked together to form a battery, the positive electrode of one cell is exposed to the negative electrode of the adjacent cell.

The assembly or stack of the cells 9 is illustrated in Fig. 2 and it is there shown that the opposed electrodes of each pair of adjacent cells are separated at their margins by two thicknesses of envelope material and one thickness of the material of separator 12. To establish electrical connection between adjacent cells, pressure is applied to the ends of the stack under which each plastic mix cake 14 undergoes deformation in which there is a reduction of thickness at the borders and possibly some increase in thickness at the remainder. Such deformation is accompanied by a bulging of the positive electrode 16 into the space occupied by the openings 20 so as to bring the surface of the positive electrode 16 into firm pressure contact with the surface of the adjacent negative electrode 10. At the same time the marginal portions of the envelopes 18 surrounding the openings 20 are brought into firm pressure engagement with each other and with the negative electrode 10 of one cell and the positive electrode 16 of the adjacent cell whereby the interiors of said cells are isolated from each other and the liquid of each cell is confined to that cell. In order that this isolation be effective, the material of the envelopes 18 surrounding openings 20 extends inwardly somewhat farther than does the border portion of the separator 12 as indicated at 21 whereby the envelope material makes direct contact with the negative electrode 10.

The assembly of cells 9 making up the battery may be held in pressure contact by the bands or tapes 22, or other suitable means may be employed for this purpose. Suitable terminals may be provided. For example, one terminal conductor 24 may be connected as by soldering to the negative electrode of one end cell and a conductive terminal plate 26 of metal may be arranged in direct pressure conductive engagement with the positive electrode of the other end cell and a terminal conductor 28 may be connected as by soldering to terminal plate 26. The projecting joints 19 may be folded flat against the edges of the cells and the entire battery may be given a protective, moisture-resistant coating of a suitable material such as microcrystalline wax.

As stated heretofore, the difficulty has been encountered in batteries employing isolated cells having thin carbon positive electrodes in that the said electrodes are not impervious to cell liquid and therefore do not maintain the desired confinement of such liquid within the cells. In accordance with the present invention, the positive carbon electrode 16 is constructed so as to overcome this difficulty and provide a complete barrier to the passage of the liquid. Said electrode is composed of a thin, non-conductive, sheet-form base 30 which is preferably flexible and may be composed of a woven fabric of a material such as cotton, rayon, nylon, glass fibers, or the like. A knitted or felted fabric of similar material may likewise be used. An example of a satisfactory base is ordinary cotton bandage gauze. The base is essentially porous or intersticed, and preferably is foraminous so that the openings extend directly through it. In Figs. 4 and 5 the base 30 is illustrated as being a woven fabric and the spacing or interstices 37 between the strands 36 thereof are exaggerated for convenience in illustrating.

The base 30 is impregnated with a conductive composition 32 composed of conductive carbon particles and a binder, which may be applied to the base in any suitable manner. As an example, a liquid may be prepared containing the binder in solution and the carbon particles in suspension therein, and the liquid may be applied to the base and the solvent evaporated away to leave a solid conductive composition. Liquid compositions of this character are known and are frequently called carbon paints and there is a variety of such carbon paints which are suitable for forming the conductive composition 32. The following are several examples, the proportions being in parts by weight:

*Example 1*

| | Parts |
|---|---|
| Polyisobutylene | 300 |
| Polystyrene | 300 |
| Acetylene black | 150 |
| Graphite | 500 |
| Toluene | 1750 |

*Example 2*

| | Parts |
|---|---|
| Cellulose acetate | 38 |
| Methyl phthalyl ethyl glycolate | 30 |
| Acetylene black | 32 |
| Ethyl acetate | 150 |

In Example 1, toluene is the solvent and polyisobutylene and polystyrene serve as the binder, and acetylene black and graphite are the conductive carbon particles. In Example 2, ethyl acetate is the solvent and cellulose acetate serves as the binder for the conductive carbon particles which in this case are composed of acetylene black. The methyl phthalyl ethyl glycolate is a plasticizer for the cellulose acetate. Both compositions are given by way of example and not of limitation. The proportions and the character of the ingredients are not critical and may be varied as desired in order to provide a suitable carbon paint.

The carbon paint may be applied to the fabric base 30 by several known methods for coating fabric with liquids of this character such as spraying, dipping or spreading. In spreading, the base is passed in contact with the upper surface of a rotating roll, the lower portion of which makes contact with a bath of the liquid. The roll transfers liquid to the base. The fabric then passes over a stationary bar which spreads the liquid coating over the surface of the fabric. The preferred method is by dipping the base in a bath of the paint, during which operation, a thin coating adheres to each side of the base. The coated base is then dried when the solvent evaporates. The application is controlled so that the base is impregnated and coated, and the interstices are filled and pinholes are not visible. It is preferred that the conductive composition 32 be built up in thin layers by several applications and the liquid paints described heretofore are of suitable viscosity for this purpose. Each application is followed by a drying operation to evaporate the solvent. The result is the incorporation of the conductive composition 32 within the interstices and upon the surfaces of the fabric base 30. The resulting impregnated sheet may be appreciably thicker than the unimpregnated fabric base 30, but it may follow to some extent the surface contour of the base. As is illustrated in Fig. 5, elevations occur in the base where the strands 36 cross each other and the carbonaceous composition 32 has elevations 38 coinciding with the elevations of the base 30 and depressions 40 where the interstices 37 of the base occur. The impregnated sheet is flexible and is satisfactorily conductive of electricity for its purpose.

It has been found that such an electrode as described is not sufficiently impermeable to satisfactorily confine the liquid of the cell, and in accordance with the present invention it has been discovered that the electrode may be rendered impervious without impairing its conductivity by a controlled treatment with wax. Any of the waxes may be used, such as microcrystalline wax, paraffin, ceresin, candelilla, carnauba, montan and beeswax. The synthetic waxes which are available on the market may also be used. It is applied to the sheet in the molten condition as by dipping the sheet in a bath of the molten wax, and the surfaces of the sheet are then wiped or scraped while the sheet is firmly supported and while the wax is still hot and fluid and before it has solidified, whereby the wax is removed from at least portions of the surfaces of the sheet. This operation is satisfactorily carried out by wiping the surfaces with a cloth such as cheese cloth or scraping with a rubber blade or other flat instrument. The remaining wax is then allowed to cool and solidify.

The action of the wax and its disposition upon the coated sheet are not fully understood because of the difficulty of determining this upon examination even under a microscope, but it is believed that it remains in the depressions in the surface of the sheet and fills the minute openings which may be present while it leaves the elevations exposed. The following is an explanation of what is believed to be the final structure. The depressions probably represent the thin spots in the sheet where passage of liquid is most apt to occur. Also, minute openings in the form of channels or pores are present in the carbonaceous composition 32, formed by rupturing during the evaporation of the solvent therefrom. The coating operation applies a coating of wax upon the surfaces which also fills the minute openings. The wiping removes substantially all of the wax at at least portions of the surfaces, such as the elevations. It may be that it is not entirely removed at these areas but if this is so, the remaining wax is so thin that it interposes substantially no electrical resistance. At the same time, the wiping does not remove the wax from the minute openings and probably not from the deeper portions of the depressions which represent the thin spots. The penetration by the cell liquid may take place at either the thin spots or the openings in the absence of the wax. The elevations make pressure contact with the electrode 10 on one side and the mix 14 on the other and are of sufficient area that the desired electrical connection is made and the conductivity is not lowered by the presence of the wax. In Fig. 5, the wax coating 34 is shown as being discontinuous and present at the depressions and absent at the elevations. A minute opening 42 is illustrated in the conductive composition 32, and is shown as being filled with wax.

An examination of the finished electrode in reflected light or under the microscope yields little information as to the actual disposition of the wax, because of the black color due to the presence of the carbon. However, a sheet constructed exactly as described heretofore but omitting the carbon particles indicates that the wax is concentrated at the surface depressions and substantially absent at the elevations. In any event, the application of the wax in the manner described produces the surprising result that the thin electrode is rendered impermeable and at the same time its electrical resistance is not increased. The electrode is also rendered impervious to water by the treatment, whereas it is not waterproof without the treatment. With respect to conductivity, at the interstices 37 of the base fabric 30 the conductive composition 32 extends directly and continuously from one surface to the other and the conductivity across the electrode 16 is the highest at these locations, and with such portions at least partly in contact with both of the adjacent elements 10 and 14 the effective conductivity of the electrode in the battery is high.

An alternative method of applying the wax is by incorporating it in the carbon paint used for the last application to the fabric. After the last application has been made and the solvent has evaporated, the conductive sheet 16 is heated as by passing it between infra red heat lamps to melt the wax, whereupon the latter migrates to the portions of the sheet, such as the depressions and the minute openings 42. The heating is then discontinued and the wax cools and solidifies. It renders the sheet impervious to cell liquid and does not substantially increase its resistance. The disposition of the wax is believed to be substantially the same as results from the method described heretofore.

What is claimed is:

1. In a primary cell containing a liquid electrolyte, a thin, flexible, sheet-form, conductive carbonaceous electrode impervious to said electrolyte and capable of conducting electrical current to a conductive element by dry contact of the broad surface thereof with said element, comprising a thin, flexible, foraminous, non-conductive sheet, a conductive carbonaceous composition comprising carbon particles and a binder substantially filling the openings of said foraminous sheet and thinly coating both surfaces of said sheet, said carbonaceous composition having minute openings therein and depressions in the surfaces thereof, and a wax filler filling said minute openings and covering the bottoms of said depressions, the undepressed areas of said surfaces being substantially free of wax.

2. The primary cell construction as claimed in claim 1 in which the conductive carbonaceous composition fills the openings of the foraminous non-conductive sheet and extends directly and continuously from one surface to the other of the electrode.

3. In a primary cell containing a liquid electrolyte, a thin, flexible, sheet-form conductive carbonaceous electrode impervious to said electrolyte and capable of conducting electrical current to a conductive element by dry contact of the broad surface thereof with said element, comprising a thin, flexible liquid-pervious sheet of woven non-conductive fabric, a conductive carbonaceous composition comprising carbon particles and a binder impregnating said fabric and thinly coating both surfaces thereof, said impregnated fabric having minute openings therethrough, and a wax filler filling said openings and coating depressed portions of the surfaces of said impregnated fabric, elevated portions of said surfaces being substantially free of wax.

SAM KURLANDSKY.

REFERENCES CITED

The following references are of record in the file of this patent:

UNITED STATES PATENTS

| Number | Name | Date |
| --- | --- | --- |
| 690,770 | Reed et al. | Jan. 7, 1902 |
| 1,267,349 | Smith | May 21, 1918 |
| 1,639,981 | Storey et al. | Aug. 23, 1927 |
| 1,640,039 | Keller | Aug. 23, 1927 |
| 1,737,130 | Storey et al. | Nov. 26, 1929 |
| 1,739,784 | Dam | Dec. 17, 1929 |
| 2,050,172 | Gordon | Aug. 4, 1936 |
| 2,496,709 | Gelardin | Feb. 7, 1950 |
| 2,521,800 | Martinez et al. | Sept. 12, 1950 |
| 2,526,789 | Woodring | Oct. 24, 1950 |

FOREIGN PATENTS

| Number | Country | Date |
| --- | --- | --- |
| 145,018 | Great Britain | Oct. 12, 1921 |
| 365,754 | Great Britain | Jan. 28, 1932 |

OTHER REFERENCES

Modern Packaging, vol. 17, No. 5, January 1944, pages 47–50.